(12) United States Patent
Nakayama et al.

(10) Patent No.: US 6,611,322 B1
(45) Date of Patent: Aug. 26, 2003

(54) OPTICAL TIME DOMAIN REFLECTOMETER WHICH MEASURES AN OPTICAL FIBER WITH DIFFERENT WAVELENGTHS ACCORDING TO AN ORDER AND COLLECTIVELY DISPLAYS WAVEFORM DATA AND A LIST OF EVENTS FOR EACH WAVEFORM IN THE SAME SCREEN

(75) Inventors: Norio Nakayama, Atsugi (JP); Takashi Oshimi, Isehara (JP); Shigeo Hori, Atsugi (JP); Masaaki Tamakoshi, Atsugi (JP); Yasuhiro Miyake, Atsugi (JP)

(73) Assignee: Anritsu Corporation, Tokyo (JP)

( * ) Notice: Subject to any disclaimer, the term of this patent is extended or adjusted under 35 U.S.C. 154(b) by 56 days.

(21) Appl. No.: 09/830,531

(22) PCT Filed: Sep. 6, 2000

(86) PCT No.: PCT/JP00/06026

§ 371 (c)(1),
(2), (4) Date: Apr. 26, 2001

(87) PCT Pub. No.: WO01/18520

PCT Pub. Date: Mar. 15, 2001

(30) Foreign Application Priority Data

Sep. 6, 1999 (JP) .......................................... 11-252155

(51) Int. Cl.⁷ .............................................. G01N 21/00
(52) U.S. Cl. ..................................................... 356/73.1
(58) Field of Search ......................... 356/73.1, 44, 479; 359/124, 248, 305, 110, 177; 385/134, 100; 250/227.11, 227.28

(56) References Cited

U.S. PATENT DOCUMENTS 5,179,420 A 1/1993 So et al.
5,528,356 A * 6/1996 Harcourt .................... 356/73.1

FOREIGN PATENT DOCUMENTS

| EP | 0 313 020 | * | 4/1989 |
| EP | 0 882 993 A3 | | 12/1998 |
| EP | 0 882 993 A2 | | 12/1998 |
| JP | 4-351935 | | 12/1992 |
| JP | 5-281087 | | 10/1993 |
| JP | 9-26377 | | 1/1997 |
| JP | 11-119028 | | 4/1999 |

OTHER PUBLICATIONS

Spec. Sheet of OTDR, Model MW 9070B, Anritsu, submitted to Patent Examiner at the trade fair "Electronica" in Munich, Germany, Nov. 1998, XP002221484 –pp. 64–68, Figure 1; p. 65, right–hand column, Figure 3.

* cited by examiner

Primary Examiner—Tu T. Nguyen
(74) Attorney, Agent, or Firm—Frishauf, Holtz, Goodman & Chick, P.C.

(57) ABSTRACT

A light pulse generator is connected with one end of an optical fiber which selectively emits light pulses of a plurality of wavelengths to the optical fiber. A photodetector outputs a signal corresponding to the strength of the light reflected from the optical fiber. A storage unit stores the signal output from the photodetector for each wavelength. A processor determines the position and characteristic of an event based on the waveform data for each wavelength stored in the storage device. A display device has first and second display areas. A display controller allows the first display area to display the waveform data for each wavelength stored in the storage unit in a discriminable manner, and allows the second display area to display a list of positions and characteristics of events for each wavelength determined by the processor.

14 Claims, 3 Drawing Sheets

OPTICAL TIME DOMAIN REFLECTOMETER WHICH MEASURES AN OPTICAL FIBER WITH DIFFERENT WAVELENGTHS ACCORDING TO AN ORDER AND COLLECTIVELY DISPLAYS WAVEFORM DATA AND A LIST OF EVENTS FOR EACH WAVEFORM IN THE SAME SCREEN

This application is a U.S. National Phase Application under 35 USC 371 of International Application PCT/JP00/06026(not published in English) filed Sep. 6, 2000.

TECHNICAL FIELD

The present invention relates to an optical time domain reflectometer (hereinafter abbreviated to OTDR) and, more particularly to, an OTDR for injecting a light pulse to an optical fiber line under test and then receiving a return light therefrom to thereby measure transmission properties of the optical fiber line, the OTDR employing technologies for facilitating the evaluation of the optical fiber line.

BACKGROUND ART

An OTDR has conventionally been used to check for a fault or deterioration of an optical fiber line.

This type of OTDR injects a light pulse having the same wavelength as that of a light used by a communication system using an optical fiber line to one end of the optical fiber line under test so that until a predetermined time elapses from a time of that injection it can detect the intensity of the light reflected back to that end.

Then, the OTDR can display a waveform indicating a time-wise change (which can be calculated as a distance) in the intensity of that reflected light on the screen of a display, thus observing the transmission properties of the optical fiber line.

Recently, however, there has appeared a communication system for using an optical fiber line to multiple-transmit lights having different wavelengths.

To test such a communication system's optical fiber line, the prior art has employed such a scheme that the OTDR side can selectively inject light pulses with different wavelengths to the optical fiber line and also that the final controlling element can be operated to switch these wavelength of the light pulses incident upon the optical fiber line in order to obtain waveform data for each of thus switched wavelength, thereby selectively displaying thus obtained waveform data for each wavelength by the operations of the final controlling element.

The above-mentioned prior art OTDR, however, has had to switch the wavelength by the operations of the final controlling element, thus leading to a problem of troublesome operations.

The above-mentioned prior art OTDR has had also to observe the waveform by sequentially switching the waveform data for each wavelength on the final controlling element, thus leading to a problem of difficulty in grasping a difference, due to a difference in wavelength, in the characteristics of the optical fiber line.

The above-mentioned prior art OTDR has also calculated characteristic values of the optical fiber at a plurality of event occurrence points on the optical fiber line and then displayed them in a list on an indicator (e.g., CRT, LCD, etc.), which has the following problem.

That is, the user of the OTDR has to localize a faulty one of the plurality of event occurrence points which has an abnormal value by visually inspecting the characteristic values displayed on the indicator, thus taking a considerably lapse of time to evaluate the optical fiber line.

DISCLOSURE OF INVENTION

IT is an object of the invention to provide an OTDR that solves the above-mentioned problems and that is easy in operation to facilitate grasping of a difference in characteristics of an optical fiber line caused by a difference in wavelength and also to discriminate, by displaying, characteristic values of event occurrence points on the optical fiber line between characteristic values outside an allowable range predetermined by the user and the other characteristic values, thus rapidly localizing the faulty points on the fiber line.

According to one aspect of the invention, there is provided an OTDR comprising:

a light pulse generating means (24) connected to one end of an optical fiber to be measured, for selectively injecting light pulses having a plurality of wavelengths to the optical fiber to be measured;

a light receiving means (30) for receiving the light reflected from the above-mentioned optical fiber to be measured to then output a signal corresponding to the intensity of that light received;

a memory means (32) for storing the signal output from the above-mentioned light receiving means as waveform data and then store it for each of the above-mentioned wavelengths;

an arithmetic operation means (40) for operating the positions and characteristics of the events based on the waveform data for each wavelength stored in the above-mentioned memory means;

a display unit (22) having a first and second display regions; and display control means (41 and 46) for discriminating, by displaying in the first display region of the above-mentioned display unit, the waveform data pieces for each wavelength stored in the above-mentioned memory means from each other and, at the same time, displaying in the second display region of the second display region of the above-mentioned display unit the positions and characteristics of the events corresponding to each wavelength which are operated by the above-mentioned arithmetic operation means.

BEST MODE OF CARRYING OUT OF THE INVENTION

Figure 1:
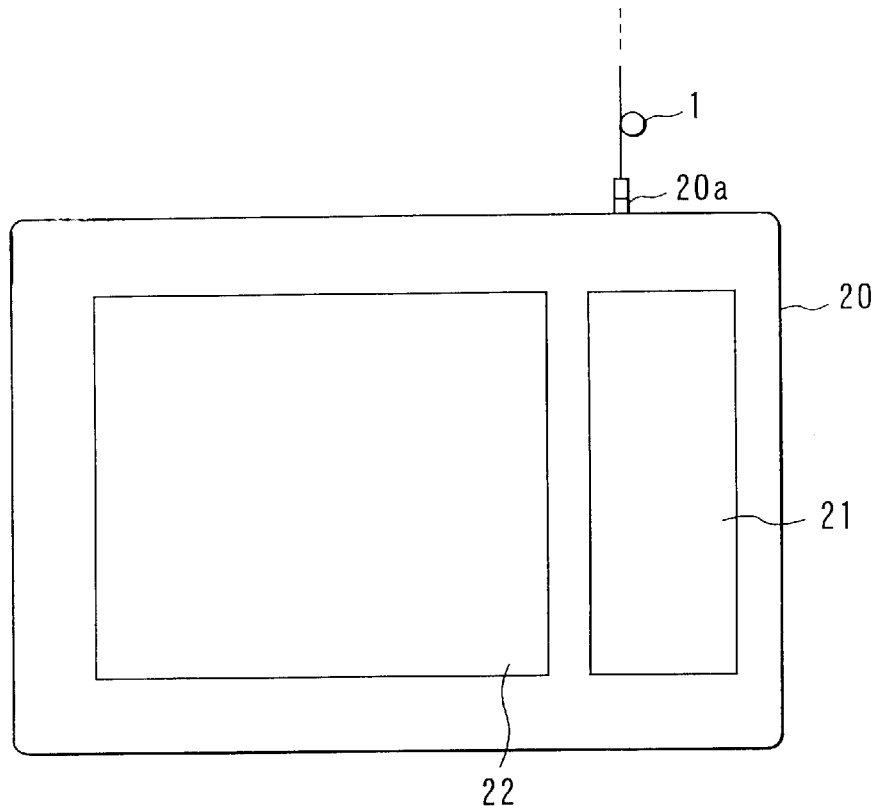
FIG. 1 is a schematic front view for showing an outline of an embodiment of an OTDR according to the invention.

First, the invention is outlined as follows.

To achieve the above-mentioned object, an OTDR according to the invention comprises a connection terminal (20a) for connecting to one end of an optical fiber line under test, a light pulse generating means (24) formed so as to selectively emit light pulses with different wavelengths for injecting these light pulses via the above-mentioned connection terminal to the above-mentioned one end of the optical fiber, a light receptor (30) for receiving the light injected to the side of the above-mentioned connection terminal from the above-mentioned optical fiber line to then output a reception light signal corresponding to the intensity of that received light, an A/D converter (31) for sampling the reception light signal output from the above-mentioned light receptor to then convert it to a digital value, a memory (32) for storing the data, a data write-in means (33) for storing a series of digital values output from the above-mentioned A/D converter during a time from a time when one light pulse is injected to the one end of the above-mentioned optical fiber line from the above-mentioned light pulse generating means to a time when a predetermined time lapse elapses therefrom as waveform data representing the transmission properties of the above-mentioned optical fiber line in a region of the above-mentioned memory which corresponds to a wavelength of the above-mentioned light pulse, a measurement controlling means (35) for switching the wavelength of a light pulse injected to the one end of the above-mentioned optical fiber line by the above-mentioned light pulse generating means according to a preset measurement schedule to thereby store the waveform data for each wavelength in the above-mentioned memory, an event detecting means (42) for obtaining for each wavelength a position where the intensity of a light processing from one end to the other of the above-mentioned optical fiber line changes at least locally based on the waveform data for each wavelength stored in the above-mentioned memory as an event occurrence position to thereby calculate a characteristic value of the optical fiber line at the event occurrence position for the above-mentioned each wavelength, a display (22) having a first and second display regions, a waveform displaying means (41) for displaying orthogonal coordinates consisting of a distance axis and a light intensity axis in the first display region of the above-mentioned display unit and, at the same time, collectively displaying in these coordinates the waveform data for each wavelength stored in the above-mentioned memory, and an event displaying means (46) for displaying, in a list, event occurrence positions for each wavelength which are detected by the event detecting means and characteristic values at those event occurrence positions for the above-mentioned each wavelength.

The OTDR according to the invention has a waveform comparing means (43) for comparing waveform patterns of events which have different wavelengths and which have their occurrence positions, of the event occurrence positions for each wavelength detected by the above-mentioned event detecting means, in a predetermined distance range to thereby decide whether they agree with each other, in which the above-mentioned event displaying means displays a plurality of events decided to agree in waveform pattern by the above-mentioned waveform comparing means in such a manner that they may be recognized to be a common event that have occurred at the same position on the optical fiber line.

The OTDR according to the invention has also an allowable range setting means (44) for beforehand setting an arbitrary allowable range for the above-mentioned characteristic value and a characteristic value deciding means (45) for deciding whether a characteristic value of an event detected by the above-mentioned event detecting means is within an allowable range set by the above-mentioned allowable range setting means, in which the above-mentioned event displaying means displays a characteristic value decided to be out of the above-mentioned allowable range by the above-mentioned characteristic value deciding means in such a manner that the value may be discriminated from the other characteristic values.

Based on the above-mentioned outline the following will describe the embodiment of the invention with reference to the drawings.

FIG. 1 shows a schematic outline of an OTDR20 according to one embodiment of the invention.

Figure 2:
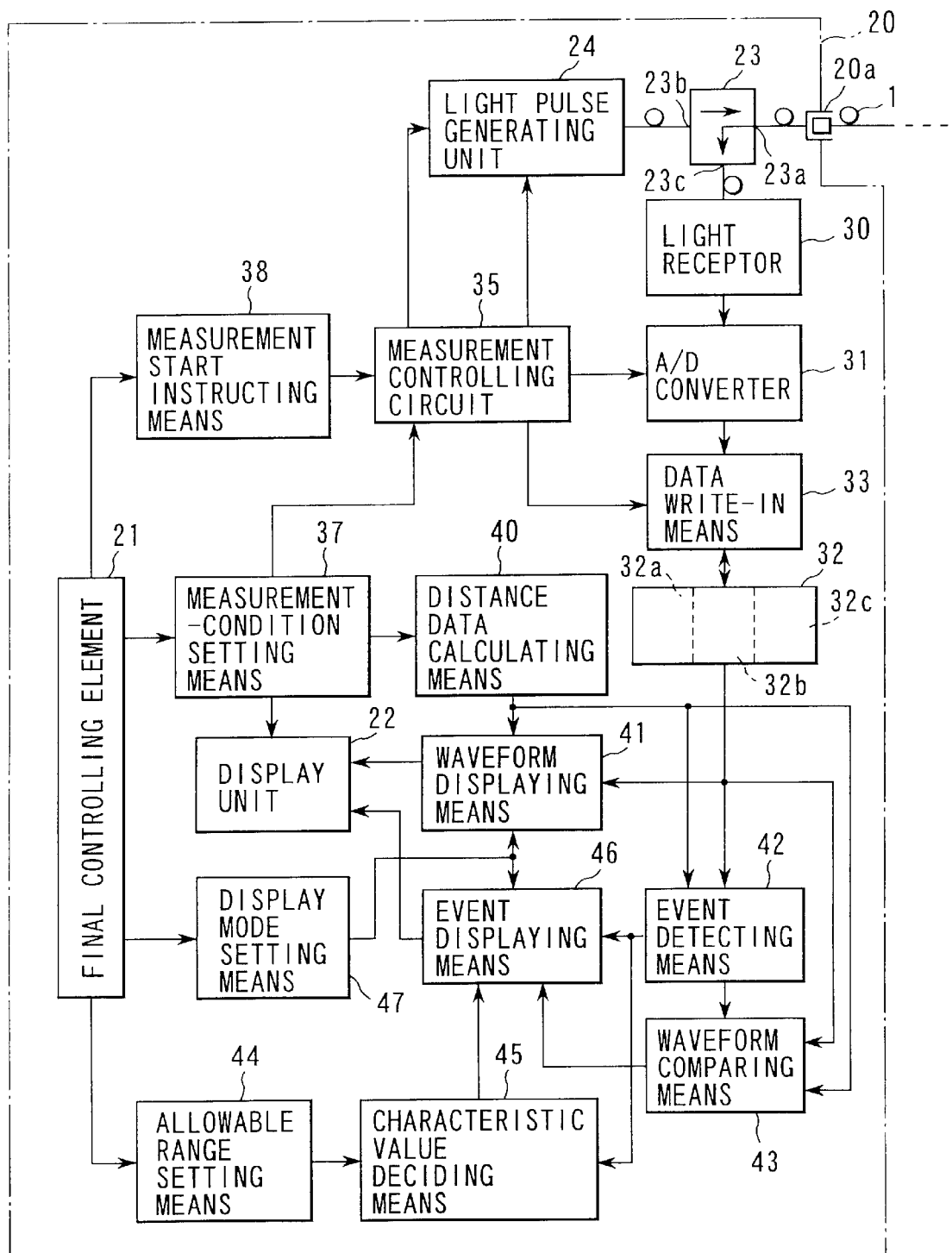
FIG. 2 is a block diagram for showing a configuration of the embodiment of the OTDR according to the invention.

FIG. 2 shows an overall block diagram of the OTDR20 of the invention.

As shown in FIG. 1, this OTDR20 is provided with a connection terminal 20a on the right side of its roughly rectangular flat cabinet for connecting thereat an optical fiber line under test and the final controlling element 21 and the LCD type display unit 22 on its front side.

As shown in FIG. 2, the connection terminal 20a is configured so as to connect thereat one end of an optical fiber line under test by use of a connector from outside.

To this connection terminal 20a is fiber-connected a first port 23a of a directional coupler 23 having three ports.

The directional coupler 23 emits a light injected from a second port 23b from the first port 23a and also emits a light injected from the first port 23a to a third port 23c.

To the second port 23b of this directional coupler 23 is fiber-connected the light pulse generating unit 24.

To the third port 23c of this directional coupler 23 in turn is fiber-connected the light receptor 30.

The light pulse generating unit 24 is configured so as to selectively emit a plurality of light pulses having different wavelengths.

Figure 3:
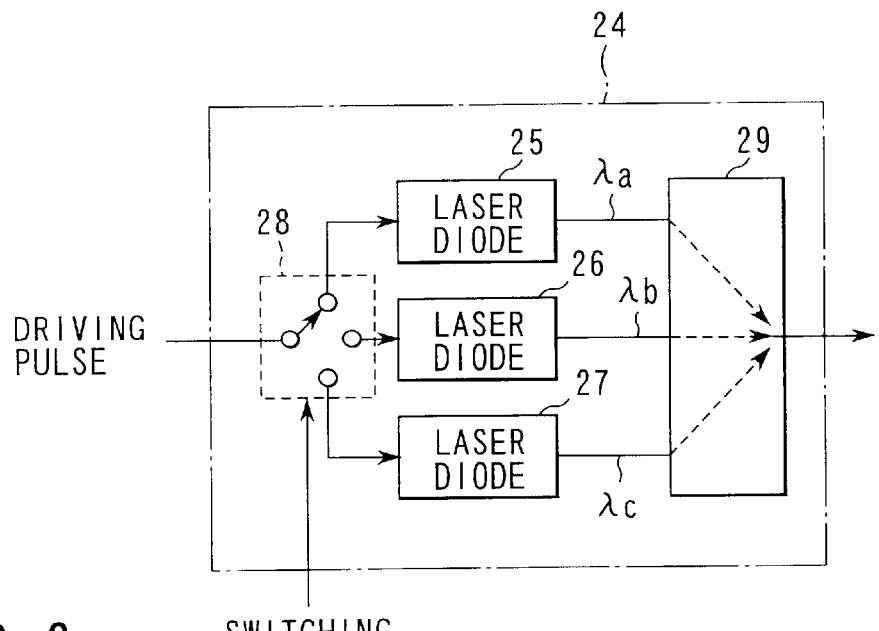
FIG. 3 is an illustration for exemplifying an internal configuration of a light pulse generating unit 24 of FIG. 2.

As shown in FIG. 3, this light pulse generating unit 24 comprises, for example, three laser diodes 25, 26, and 27 for emitting laser beams having different wavelengths, a switch 28 for selectively supplying a driving pulse for emitting light pulses from these laser diodes 25, 26, and 27 to either one of these laser diodes, and a three-to-one wave combiner 29 for injecting light pulses emitted from these laser diodes 25, 26, and 27 to the second port 23b of the directional coupler 23.

From the laser diodes 25, 26, and 27 respectively, light pulses having mutually different wavelengths of $\lambda a$ (e.g., 1550 nm), $\lambda b$ (e.g., 1625 nm), and $\lambda c$ (e.g., 1310 nm) are emitted in synchronization with a driving pulse from the measurement controlling circuit 35 described later.

Although this example selectively supplies a driving pulse to the laser diodes 25, 26, and 27 having different wavelengths to thereby switch the wavelength of an emitted light, one laser beam source capable of altering the wavelength may be controlled so as to switch the wavelength of an emitted light.

The switch 28 is switched by a switching signal from the measurement controlling circuit 35.

The light receptor 30 connected to the third port 23c of the directional coupler 23 comprises photo-receptor elements such as avalanche photo-diodes (APDS) having almost the same sensitivity to the above-mentioned wavelengths $\lambda a$, $\lambda b$, and $\lambda c$.

With this, this light receptor 30 receives a light via the directional combiner 23 which has returned from the optical fiber line 1 connected to the connection terminal 20a and then outputs a reception light signal having a magnitude corresponding to the intensity of that returned light.

The reception light signal output from this light receptor 30 is sampled at a predetermined frequency by the analog/digital (A/D) converter 31 to be converted to digital data pieces sequentially.

This A/D converter 31 samples the light when it has received a sampling clock signal output from the measurement controlling circuit 35.

The memory 32 is provided for storing a plurality of (K) data pieces output from the A/D converter from a time when a light pulse is emitted to the connection terminal 20a to a time when a predetermined time lapse determined by an observation range elapses.

This memory 32 has three storage regions 32a, 32b, and 32c corresponding to the above-mentioned light pulse wavelengths.

It is supposed here that the storage regions 32a, 32b, and 32c have address ranges of Aa(1), Aa(2), . . . , and Aa(K), Ab(1), Ab(2), . . . , and Ab(K), and Ac(1), Ac(2), . . . , and Ac(K) respectively.

The number K of data pieces is determined by an observation range and a frequency of the sampling clock signal.

Data output from the A/D converter 31 is stored in the memory 32 by the data write-in means 33.

This data write-in means 33 writes data to the memory 32 while conducting addition operations necessary for averaging of data output from the A/D converter 31.

That is, the data write-in means 33 repeats such an operation as many as a preset number of averaging times N for each wavelength as to add K number of data pieces Di(1), Di(2), . . . , and Di(K) output from the A/D converter 31 from a time when a light pulse with a certain wavelength;i of the wavelengths $\lambda a$, $\lambda b$, and $\lambda c$ to data pieces Dti(1), Dti(2), . . . , and Dti(K) (initial values of which are all 0 at the initiation of measurement) stored in the addresses Ai(1), Ai(2), and Ai(K) respectively of the memory 32 corresponding to that wavelength $\lambda i$ and then update storage values of the addresses Ai(1), Ai(2), . . . , and Ai(K) with the resultant addition results Di(1)+Dti(1), Di(2)+Dti(2), . . . , and Di(K)+Dti(K) respectively.

If the number of averaging times N is 1 in this case, only the first obtained data pieces Di(1), Di(2), . . . , and Di(K) are stored in the addresses Ai(1), Ai(2), . . . , and Ai(K) respectively.

This data write-in means 33 conducts the above-mentioned processing based on an address signal sent from the measurement controlling circuit 35.

This measurement controlling circuit 35 sets a pulse width of a driving pulse based on information preset beforehand by a measurement-condition setting means 37 described later and also, when it has received an starting signal from a measurement start instructing means 38, specifies an emission wavelength to the light pulse generating unit 24 according to a preset measurement schedule to thereby output a driving pulse, thus injecting a light pulse to the optical fiber line 1 under test.

The measurement controlling circuit 35 also outputs a sampling clock signal to the A/D converter to sample a reception light signal to thereby change an address signal sent to the data write-in means 33, thus storing data in the memory 32.

The measurement-condition setting means 37 is provided for setting measurement parameters and a measurement schedule specified by the operations of the above-mentioned final controlling element 21.

Those measurement parameters that can be specified include a wavelength, a pulse width, a number of averaging times, an observation range (which is determined by a frequency of the sampling clock signal and a number of sampling times for each light pulse), etc.

The measurement schedule also specifies an order of switching the wavelengths mainly.

The measurement start instructing means 38 instructs the measurement controlling circuit 35 to start measurement when a particular operation for measurement starting is conducted by the final controlling element 21.

A distance data calculating means 40 calculates a distance from one end of the optical fiber line 1 respectively corresponding to each sampling timing of the A/D converter 31 in order to correlate a data piece sampled by the A/D converter 31 during measurement to a light returned from a specific position of the optical fiber line 1.

This distance needs to be calculated for each wavelength.

That is, the speed of a light passing through the optical fiber line 1 depends on the refractive index of the optical fiber line 1, which index in turn varies with the wavelength of lights even if they pass through the same optical fiber.

Therefore, a return position of a light corresponding to data output from the A/D converter 31 when a constant time has elapsed after a light pulse having a certain wavelength is emitted to the optical fiber line 1 is different from a return position of a light corresponding to data output from the A/D converter 31 after a constant time has elapsed after a light pulse having a different wavelength from that is emitted to the optical fiber line 1.

Accordingly, the distance data calculating means 40 calculates a distance for each wavelength at each sampling timing.

Thus calculated distance, however, has an error because there are fluctuations in the refractive index for wavelengths through the optical fiber line 1.

The waveform displaying means 41 displays, when collective display is specified by a display mode setting means 47, in the first display region of the display unit 22 orthogonal coordinates in which its vertical axis represents a level and its horizontal axis represents a distance and collectively displays the data of each waveform stored in the memory 32 based on the distance data for each wavelength calculated by the distance data calculating means 40.

In this collective display, the waveform data is displayed in different colors and line types for discrimination.

When individual display is specified by the display mode setting means 47, on the other hand, waveform data specified by the operations of the final controlling element 21 is displayed in the orthogonal coordinates.

The event detecting means 42 detects, for the data of each waveform stored in the memory 32, as an event occurrence position such positions where the light intensity changes locally as at least a fiber fusion connection point, a fiber connector connection point, a disconnection occurrence point, an end point, etc.

Then, the event detecting means 42 calculates characteristic values such as a type of thus detected events (which type mainly indicates whether the deterioration is accompanied by reflection as at a fiber connector connection point, a disconnection occurrence point, or an end point or the deterioration is not accompanied by reflection as at a fiber fusion connection point), a loss quantity at the event occurrence position, a reflectance (return loss), etc.

Besides the above-mentioned characteristic values, this event detecting means 42 calculates also such characteristic values as an average deterioration quantity along the line between fiber connection points and a total loss along the fiber from its leading point to its end point for each wavelength.

Figure 4:
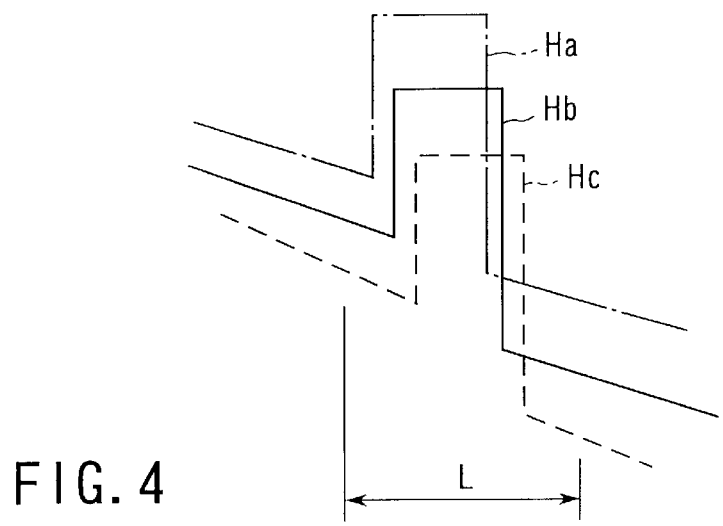
FIG. 4 is an illustration for explaining operations of an important part of the OTDR according to the invention.

The waveform comparing means 43 compares, as shown in FIG. 4, for example, patterns of waveforms Ha, Hb, and Hc of events which occurred within a range of a predetermined distance L (e.g., 30 m) as for the event occurrence positions detected for each waveform data and, if these patterns agree, outputs information indicating that the concerned events occurred at a common position along the optical fiber line 1.

In this case, in comparison of the patterns, the waveform comparing means 43 uses one of these waveforms Ha, Hb, and Hc as a reference to thereby shift the other waveforms in a distance (time) direction and a level direction and, if they are resultantly correlated with each other, decides that the patterns have agreed.

The allowable range setting means 44 is provided for setting an allowable range for characteristic values by means of the operations of the final controlling element 21.

The characteristic value deciding means 45, on the other hand, decides whether a characteristic value of an event detected by the event detecting means 42 is within an allowable range set by the allowable range setting means 44.

When collective display is specified by the display mode setting means 47, the event displaying means 46 displays in a list a number, an occurrence position, a type, a characteristic value, an employed wavelength, etc. of a detected event for each waveform data, in the second display region different from the above-mentioned first display region of the display unit 22.

When individual display is specified by the display mode setting means 47, on the other hand, it displays in a list a number, an occurrence position, a type, a characteristic value, and an employed wavelength of a detected event for waveform data specified by the operations of the final controlling element 21, in the second display region.

In the collective display mode, this event displaying means 46 processes events decided by the waveform comparing means 43 that their waveform patterns have agreed, in such a manner that their event numbers are made common and it can be recognized that these events have occurred at a common position along the optical fiber line 1.

The event displaying means 46 displays characteristic values decided by the characteristic value deciding means 45 to be out of an allowable range in such a manner that those values can be discriminated from the others.

This discriminative display may be such as to display, besides characteristic values, for example, event numbers and their event field as a whole so that they may be discriminated from the other event numbers or event fields.

This discrimination may also come in reverse display of the characters and the background, color coding display, flashing display, or addition of an underline, an enclosing line, a particular warning mark, etc.

This discriminative display is conducted irrespective of specification by the display mode setting means 47.

The display mode setting means 47 makes setting whether to collectively display for all waveforms the list of waveform data and events displayed on the display unit 22 by the operations of the final controlling element 21 or to individually display them individually for each waveform.

Accordingly, when individual display is specified, this display mode setting means 47 makes setting so that a list of the waveform data and events to be displayed can be specified by the operations of the final controlling element 21.

The following will describe one example of an OTDR 20 configurated as above.

It is supposed that, beforehand, predetermined measurement parameters are set by the measurement-condition setting means 37 and also such a schedule is set as to switch the wavelength of a light pulse to $\lambda a$, $\lambda b$, and $\lambda c$ in this order in measurement and also that collective display is specified by the display mode setting means 47.

When measurement starts in this state, the measurement controlling circuit 35 specifies a wavelength $\lambda a$ for the light pulse generating unit 24 and then outputs a driving pulse having a predetermined width.

When having received this driving pulse, the light pulse generating unit 24 injects to one end of the optical fiber line 1 a light pulse having a wavelength $\lambda a$ synchronized with the driving pulse.

Then, when a scattered light etc. due to this injected light pulse are returned through the fiber line 1 to that one end and received by the light receptor 30, the relevant reception light signal is sampled at a predetermined frequency by the A/D converter 31 to be converted into digital data and then stored in the region 32a of the memory 32 in an order of addresses.

When data pieces as many as a number corresponding to a preset observation range are stored in the region 32a of the memory 32, the measurement controlling circuit 35 outputs a second driving pulse to the light pulse generating unit 24 to thereby inject a light pulse with the wavelength $\lambda a$ synchronized with this driving pulse to the optical fiber line 1 in order to add the data obtained with the resultant return light to the data in the region 32a of the memory 32, thus updating it.

The above-mentioned processing is repeated, until the data obtained with the N'th light pulse is added to the data stored in the region 32a of the memory 32 to update it to thereby obtain waveform data averaged on the wavelength $\lambda a$.

Next, the measurement controlling circuit 35 specifies the wavelength $\lambda b$ to the light pulse generating unit 24 to repeat the above-mentioned processing in order to store in the region 32b of the memory 32 waveform data averaged on the wavelength $\lambda b$.

Subsequently, the measurement controlling circuit 35 specifies the wavelength $\lambda c$ to the light pulse generating unit 24 to repeat the above-mentioned processing in order to store in the region 32c of the memory 32 waveform data averaged on the wavelength $\lambda c$.

When thus averaged waveform data for each of the wavelengths is stored in the memory 32, the distance data calculating means 40 calculates a distance for each wavelength at each sampling timing.

Figure 5:
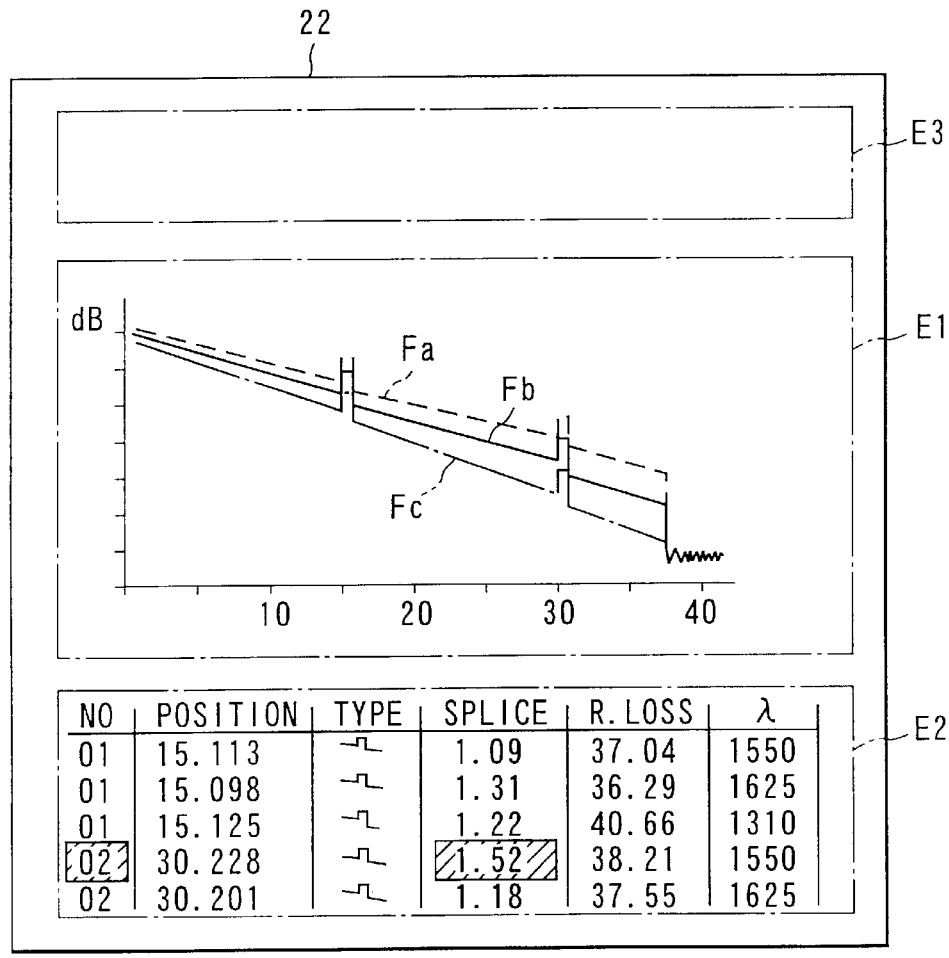
FIG. 5 is an illustration for showing a displayed example of measurement results by the OTDR according to the invention.

Also, as shown in FIG. 5, for example, the waveform displaying means 41 displays in a first display region E1 of the display unit 22 orthogonal coordinates with its vertical axis representing a level and its horizontal axis representing a distance, in which coordinates are collectively displayed waveform data pieces Fa, Fb, and Fc stored in the memory 32.

In this case, the waveform data stored in the memory 32 have been obtained by N number of time of addition.

Accordingly, to display the level in an absolute value, it is necessary to divide the data in the memory 32 by a number of averaging times N before display.

To display it in a relative value, the data in the memory 32 may be displayed as it is.

Also, based on each waveform data stored in the memory 32, the event detecting means 42 detects an event occurrence position and also calculates characteristic values such as a type of the relevant event (which mainly indicates whether the deterioration is accompanied by reflection as at a fiber connector connection point, a disconnection point, or end point or the deterioration is not accompanied by reflection as at a fiber fusion connection point), a loss quantity at an event occurrence position, a reflectance (return loss), etc.

Further, the event detecting means 42 detects events with different wavelengths which occurred at a common position along the optical fiber line 1 and, also, the characteristics value deciding means 45 decides whether a characteristic value of thus detected event is within an allowable range set by the allowable range setting means 44.

Then, as shown in FIG. 5, in a second display region E2 of the display unit 22 are listed in a table format a number of a detected event, its occurrence position (Position), its type (Type), its characteristic values [Splice (connection loss), R. Loss (return loss)], an employed wavelength (λ) etc. for each waveform data.

In this case, the events which occurred at a common position along the optical fiber line 1 are given a common event number (01.02 in this case).

Also, a characteristic value decided to be out of the allowable range and its event number (02) are, as shown in FIG. 5, reverse-displayed to thereby be discriminated from the other characteristic values and their event numbers.

Also, in a third display region E3 of the display unit 22 are displayed common measurement parameters such as an observation range, a number of averaging times, a pulse width, etc.

As described above, according to the OTDR20 of this embodiment, it is possible to automatically conduct measurement by use of light pulses with different wavelengths according to an order specified beforehand and collectively display the waveform data and a list of events obtained by the measurement for each waveform on the same screen, thus easily grasping a difference due to a difference in wavelength in properties of the optical fiber line.

Also, according to the OTDR20 of this embodiment, it is possible to compare events which have occurred in a predetermined distance range of the events with different wavelengths and, if their patterns agree, display these events in such a manner that it can be recognized that they have occurred at a common position along the optical fiber line 1, to thereby prevent misjudgment due to a shift in display of the event occurrence position caused by a difference in wavelength, thus correctly evaluating the properties of the optical fiber line 1.

Further, according to the OTDR20 of this embodiment, it is possible to discriminate in display at least characteristic values, that are out of a preset allowable range, of those characteristic values at event occurrence positions from the other characteristic values, thus rapidly grasping the faulty positions in a display of the listed events.

As described above, according to the OTDR according to the invention, it is possible to conduct automatic measurement by use of light pulses with different wavelengths according to an order specified beforehand and collectively display the waveform data and a list of events obtained by the measurement for each waveform on the same screen, thus easily grasping a difference due to a difference in wavelength in the properties of the optical fiber line.

Also, according to the OTDR of the invention, it is possible to compare waveform patterns of events, that have occurred in a predetermined distance range, of those events with different wavelengths and, if the patterns agree, display those events in such a manner that it can be recognized that they have occurred at a common position along the optical fiber line, to thereby prevent misjudgment due to a shift in event occurrence position caused by a difference in wavelength, thus correctly evaluating the a properties of the optical fiber line.

Since the OTDR of the invention discriminates in display at least characteristic values, that are out of a preset allowable range, of those characteristic values at event occurrence positions from the other characteristic values, thus rapidly grasping faulty positions in a display of the listed events.

What is claimed is:

1. An optical time domain reflectometer (OTDR) comprising:

light pulse generating means, connected to one end of an optical fiber to be measured, for selectively emitting light pulses having a plurality of wavelengths to the optical fiber to be measured;

light receiving means for receiving a light reflected from the optical fiber to be measured and then outputting a signal corresponding to an intensity of the reflected light;

storage means for storing a signal output from the light receiving means as waveform data for each of the wavelengths;

arithmetic operation means for obtaining, by arithmetic operations, a position and properties of an event based on the waveform data for each of the waveforms stored in the storage means;

a display unit having a first display region and a second display region;

display controlling means for displaying the waveform data for each of the wavelengths stored in the storage means in the first display region of the display unit and also displaying in a list a position and properties of an event corresponding to each wavelength obtained by the arithmetic operations of the arithmetic operation means in the second display region of the display unit to thereby facilitate grasping of a difference in characteristics of an optical fiber caused by a difference in wavelengths on the list; and waveform comparing means for comparing waveform patterns of events that have different wavelengths and occurrence positions within a predetermined distance range of event occurrence positions for each wavelength detected to thereby decide whether the waveform patterns agree, wherein a plurality of events decided by the waveform comparing means that waveform patterns thereof agree are displayed in such a manner that it can be recognized that they are a common event occurring at the same position along the optical fiber line;

wherein when displaying in a list a position and properties of an event corresponding to each wavelength obtained by arithmetic operations of the arithmetic operation means in the second display region of the display unit, the display controlling means displays in the form of a table at least a number, an occurrence position, a type, characteristic values including a splice (connection loss) and a return loss, an employed wavelength λ of an event obtained by arithmetic operations for each waveform data, and the display controlling means displays the events in a list in such a manner that common event numbers are added to the events which occur at common positions along the optical fiber to be measured.

2. The OTDR according to claim 1, wherein when displaying the waveform data for each of the wavelengths stored in the storage means in the first display region of the display unit, the display controlling means displays the waveform data in such a manner as to discriminate the waveform data of a selected wavelength from the waveform data of the other wavelengths.

3. The OTDR according to claim 1, wherein when displaying the waveform data for each of the wavelengths stored in the storage means in the first display region of the display unit, the display controlling means displays the waveform data in such a manner as to discriminate the waveform data for the respective wavelengths from each other.

4. The OTDR according to claim 1, wherein when displaying in a list a position and properties of an event corresponding to each wavelength obtained by arithmetic operations of the arithmetic operation means in the second display region of the display unit, the display controlling means displays in the form of a table at least an occurrence position, a splice as a characteristic value (connection loss), an employed wavelength ($\lambda$) of an event obtained by the arithmetic operations for each waveform data.

5. An optical time domain reflectometer (OTDR) comprising;
light pulse generating means, connected to one end of an optical fiber to be measured, for selectively emitting light pulses having a plurality of wavelengths to the optical fiber to be measured;
light receiving means for receiving a light reflected from the optical fiber to be measured and then outputting a signal corresponding to an intensity of the reflected light;
storage means for storing a signal output from the light receiving means as waveform data for each of the wavelengths;
arithmetic operation means for obtaining, by arithmetic operations, a position and Properties of an event based on the waveform data for each of the waveforms stored in the storage means;
a display unit having a first display region and a second display region; and
display controlling means for displaying the waveform data for each of the wavelengths stored in the storage means in the first display region of the display unit and also displaying in a list a position and properties of an event corresponding to each wavelength obtained by the arithmetic operations of the arithmetic operation means in the second display region of the display unit to thereby facilitate grasping of a difference in characteristics of an optical fiber caused by a difference in wavelengths on the list;
allowable range setting means for beforehand setting an arbitrary allowable range for characteristic values of an event corresponding to each wavelength obtained by the arithmetic operations of the arithmetic operation means; and
characteristic value deciding means for deciding whether a characteristic value of an event corresponding to each wavelength obtained by the arithmetic operations of the arithmetic operation means is within an allowable range set by the allowable range setting means,
wherein the display controlling means displays a characteristic value, which is decided to exceed the allowable range by the characteristic value deciding means, in such a manner as to discriminate the above characteristic value from the other characteristic values.

6. An optical time domain reflectometer (OTDR) comprising:
a connection terminal for connecting one end of an optical fiber line which is a test target;
light pulse generating means, formed to selectively emit light pulses having mutually different wavelengths, for injecting the light pulses via the connection terminal to the one end of the optical fiber line;
a light receptor for receiving a light injected from the optical fiber line to the connection terminal, and then outputting a reception light signal corresponding to an intensity of the received light;
a memory for storing a series of waveform data pieces of the reception light signal output from the light receptor in a region corresponding to a wavelength of the light pulse, until a predetermined time elapses after one light pulse has been injected from the light pulse generating means to the one end of the optical fiber line;
event detecting means for obtaining for each wavelength, based on waveform data for each wavelength stored in the memory, as an event occurrence position, a position where an intensity of a light proceeding from one end to the other end of the optical fiber line changes at least locally to calculate a characteristic value of the optical fiber line at the event occurrence position for each waveform;
a display unit having a first display region and a second display region different from the first display region;
waveform displaying means for displaying orthogonal coordinates consisting of a distance axis and an intensity axis of the light in the first display region of the display unit, and also collectively displaying, on the coordinates, waveform data for each wavelength stored in the memory; and
event displaying means for displaying, in the form of a list in the second display region of the display unit, an event occurrence position for each wavelength detected by the event detecting means and a characteristic value at the event occurrence position for each wavelength; and
waveform comparing means for comparing waveform patterns of events that have different wavelengths and occurrence positions within a predetermined distance range of event occurrence positions for each wavelength detected by the event detecting means to thereby decide whether the waveform patterns agree,
wherein the event displaying means displays a plurality of events decided by the waveform comparing means that waveform patterns thereof agree in such a manner that it can be recognized that they are a common event occurring at the same position along the optical fiber line.

7. The OTDR according to claim 6, further comprising:
allowable range setting means for beforehand setting an arbitrary allowable range for the characteristic value; and
characteristic value deciding means for deciding whether a characteristic value of an event detected by the event detecting means is within an allowable range set by the allowable range setting means,
wherein the event displaying means displays a characteristic value, which is decided to exceed the allowable range by the characteristic value deciding means, in such a manner as to discriminate the above characteristic value from the other characteristic values.

8. An optical time domain reflectometer (OTDR) comprising:
light pulse generating means, connected to one end of an optical fiber to be measured, for selectively emitting light pulses having a plurality of wavelengths to the optical fiber to be measured;
light receiving means for receiving a light reflected from the optical fiber to be measured and then outputting a signal corresponding to an intensity of the reflected light;
storage means for storing a signal output from the light receiving means as waveform data for each of the wavelengths;
arithmetic operation means for obtaining, by arithmetic operations, a position and properties of an event based on the waveform data for each of the waveforms stored in the storage means;
a display unit having a first display region and a second display region;
display controlling means for displaying the waveform data for each of the wavelengths stored in the storage means in the first display region of the display unit and also displaying in a list a position and properties of an event corresponding to each wavelength obtained by the arithmetic operations of the arithmetic operation means in the second display region of the display unit;
allowable range setting means for beforehand setting an arbitrary allowable range for characteristic values of an event corresponding to each wavelength obtained by the arithmetic operations of the arithmetic operation means; and
characteristic value deciding means for deciding whether a characteristic value of an event corresponding to each wavelength obtained by the arithmetic operations of the arithmetic operation means is within an allowable range set by the allowable range setting means,
wherein the display controlling means displays a characteristic value, which is decided to exceed the allowable range by the characteristic value deciding means, in such a manner as to discriminate the above characteristic value from the other characteristic values.

9. The OTDR according to claim 8, wherein when displaying the waveform data for each of the wavelengths stored in the storage means in the first display region of the display unit, the display controlling means displays the waveform data in such a manner as to discriminate the waveform data of a selected wavelength from the waveform data of the other wavelengths.

10. The OTDR according to claim 8, wherein when displaying the waveform data, for each of the wavelengths stored in the storage means in the first display region of the display unit, the display controlling means displays the waveform data in such a manner as to discriminate the waveform data for the respective wavelengths from each other.

11. The OTDR according to claim 8, wherein when displaying in a list a position and properties of an event corresponding to each wavelength obtained by arithmetic operations of the arithmetic operation means in the second display region of the display unit, the display controlling means displays in the form of a table at least an occurrence position, a splice as a characteristic value (connection loss), an employed wavelength ($\lambda$) of an event obtained by the arithmetic operations for each waveform data.

12. The OTDR according to claim 8, wherein when displaying in a list a position and properties of an event corresponding to each wavelength obtained by arithmetic operations of the arithmetic operation means in the second display region of the display unit, the display controlling means displays in the form of a table at least a number, an occurrence position, a type, characteristic values including a splice (connection loss) and a return loss, an employed wavelength ($\lambda$) of an event obtained by arithmetic operations for each waveform data.

13. The OTDR according to claim 8, wherein the display controlling means displays the events in a list in such a manner that common event numbers are added to the events which occur at common positions along the optical fiber to be measured.

14. An optical time domain reflectometer (OTDR) comprising:
a connection terminal for connecting one end of an optical fiber line which is a test target;
light pulse generating means, formed to selectively emit light pulses having mutually different wavelengths, for injecting the light pulses via the connection terminal to the one end of the optical fiber line;
a light receptor for receiving a light injected from the optical fiber line to the side of the connection terminal, and then outputting a reception light signal corresponding to an intensity of the received light;
a memory for storing a series of.waveform data pieces of the reception light signal output from the light receptor in a region corresponding to a wavelength of the light pulse, until a predetermined time elapses after one light pulse has been injected from the light pulse generating means to the one end of the optical fiber line;
event detecting means for obtaining for each wavelength, based on waveform data for each wavelength stored in the memory, as an event occurrence position, a position where an intensity of a light proceeding from one end to the other end of the optical fiber line changes at least locally to calculate a characteristic value of the optical fiber line at the event occurrence position for each waveform;
a display unit having a first display region and a second display region different from the first display region;
waveform displaying means for displaying orthogonal coordinates consisting of a distance axis and an intensity axis of the light in the first display region of the display unit, and also collectively displaying, on the coordinates, waveform data for each wavelength stored in the memory;
event displaying means for displaying, in the form of a list in the second display region of the display unit, an event occurrence position for each wavelength detected by the event detecting means and a characteristic value at the event occurrence position for each wavelength;
waveform comparing means for comparing waveform patterns of events that have different wavelengths and occurrence positions within a predetermined distance range of event occurrence positions for each wavelength detected by the event detecting means to thereby decide whether the waveform patterns agree, wherein the event displaying means displays a plurality of events decided by the waveform comparing means that waveform patterns thereof agree, in such a manner that it can be recognized that they are a common event occurring at the same position along the optical fiber line;

allowable range setting means for beforehand setting an arbitrary allowable range for the characteristic value; and characteristic value deciding means for deciding whether a characteristic value of an event detected by the event detecting means is within an allowable range set by the allowable range setting means, wherein the event displaying means displays a characteristic value, which is decided to exceed the allowable range by the characteristic value deciding means, in such a manner as to discriminate the above characteristic value from the other characteristic values.

* * * * *